United States Patent
Duchesne et al.

(10) Patent No.: US 10,224,616 B2
(45) Date of Patent: Mar. 5, 2019

(54) COMMUNICATION DEVICE FOR AN AIRCRAFT CABIN

(71) Applicants: CENTRE NATIONAL D'ETUDES SPATIALES, Paris (FR); MVG Industries, Villebon sur Yvette (FR); FLYOPS, Bordeaux (FR)

(72) Inventors: Luc Duchesne, Angervilliers (FR); Xavier Joussaume, Le Haillan (FR); Patrick Dumon, Vigoulet-Auzil (FR)

(73) Assignees: CENTRE NATIONAL D'ETUDES SPATIALES, Paris (FR); MVG INDUSTRIES, Villebon sur Yvette (FR); FLYOPS, Bordeaux (FR)

( * ) Notice: Subject to any disclaimer, the term of this patent is extended or adjusted under 35 U.S.C. 154(b) by 0 days.

(21) Appl. No.: 15/113,640

(22) PCT Filed: Jan. 21, 2015

(86) PCT No.: PCT/EP2015/051165
§ 371 (c)(1),
(2) Date: Jul. 22, 2016

(87) PCT Pub. No.: WO2015/110485
PCT Pub. Date: Jul. 30, 2015

(65) Prior Publication Data
US 2017/0005401 A1  Jan. 5, 2017

(30) Foreign Application Priority Data

Jan. 24, 2014 (FR) .................................... 14 50625

(51) Int. Cl.
*H01Q 1/28* (2006.01)
*H04B 7/185* (2006.01)
(Continued)

(52) U.S. Cl.
CPC ............ *H01Q 1/28* (2013.01); *H01Q 1/2291* (2013.01); *H01Q 1/36* (2013.01); *H01Q 1/38* (2013.01);
(Continued)

(58) Field of Classification Search
CPC .......... H01Q 1/28; H01Q 1/48; H01Q 9/0407; H04B 7/18506
USPC .................................. 343/769, 705; 370/329
See application file for complete search history.

(56) References Cited

U.S. PATENT DOCUMENTS

| | | | |
|---|---|---|---|
| 5,610,620 A * | 3/1997 | Stites | H01Q 1/28 343/700 MS |
| 5,650,792 A | 7/1997 | Moore et al. | |

(Continued)

FOREIGN PATENT DOCUMENTS

| | | |
|---|---|---|
| FR | 2912266 A1 | 8/2008 |
| JP | H07050610 | 2/1995 |

(Continued)

OTHER PUBLICATIONS

International Search Report for Application No. PCT/EP2015/051165 dated Apr. 24, 2015.

*Primary Examiner* — Hai Tran
(74) *Attorney, Agent, or Firm* — Burris Law, PLLC

(57) ABSTRACT

The invention relates to a communication device for arranging in an aircraft cabin, said device comprising: an antennae assembly designed so as to emit and receive communication data in a first frequency band of a communication network and to receive localization data in a second frequency band of a localization network, said antennae assembly comprising an antenna having a pattern of radiation revolving about a main axis, the radiation being at its maximum in the direction of said main axis, and a system for restraining the radiation, designed to limit the radiation outside said antenna axis; a modem connected to the antenna, designed so as to allow the emission and the reception of communication data via a communication network; and a localization data receiver.

9 Claims, 4 Drawing Sheets

(51) Int. Cl.
*H01Q 1/38* (2006.01)
*H01Q 1/48* (2006.01)
*H01Q 9/04* (2006.01)
*H01Q 1/22* (2006.01)
*H01Q 1/36* (2006.01)

(52) U.S. Cl.
CPC .............. *H01Q 1/48* (2013.01); *H01Q 9/045* (2013.01); *H01Q 9/0407* (2013.01); *H01Q 9/0435* (2013.01); *H01Q 9/0442* (2013.01); *H04B 7/18506* (2013.01)

(56) References Cited

U.S. PATENT DOCUMENTS

| | | | | |
|---|---|---|---|---|
| 6,121,936 | A * | 9/2000 | Hemming | H01Q 9/27 343/725 |
| 2012/0009942 | A1* | 1/2012 | Zoubir | G01S 3/74 455/456.1 |
| 2013/0002494 | A1* | 1/2013 | Ayala | H01Q 1/2266 343/702 |
| 2013/0120201 | A1* | 5/2013 | Park | H01Q 1/48 343/749 |
| 2014/0192725 | A1* | 7/2014 | Black | H04W 72/10 370/329 |

FOREIGN PATENT DOCUMENTS

| | | |
|---|---|---|
| JP | H08018330 | 1/1996 |
| JP | 2001060824 | 3/2001 |
| JP | 2007306368 | 11/2007 |
| WO | 9521388 A1 | 8/1995 |

\* cited by examiner

COMMUNICATION DEVICE FOR AN AIRCRAFT CABIN

CROSS REFERENCE TO RELATED APPLICATIONS

The present application is a national phase entry under 35 U.S.C. § 371 of International Application No. PCT/EP2015/051165, filed Jan. 21, 2015, which claims priority from French Patent Application No. 1450625, filed Jan. 24, 2014, the disclosures of which are incorporated by reference herein.

GENERAL TECHNICAL FIELD

The invention relates to communication devices allowing communication from an aircraft with a data and/or localization network.

PRIOR ART

An aircraft is often equipped with communication devices that allow communication with a data and/or localization network. A data network is of the IRIDIUM type (data communication network using a constellation of satellites) and a localization network is of the GPS type (Global Positioning System). The communication devices generally consist of transmitting/receiving systems and antennas.

In known fashion, the aircraft is equipped with several antennas, each dedicated to a particular network. In addition, so as not to disturb the electronic equipment of the aircraft, these antennas are positioned on the shell of the aircraft.

This is not without problems.

In fact, as soon as equipment is positioned on the shell of the aircraft, the entire structure of the latter must be re-certified for obvious reasons of safety. This is even more constraining when the number of antennas is large.

PRESENTATION OF THE INVENTION

The invention proposes to correct at least one of these disadvantages.

To this end, the invention proposes a communication device intended to be positioned in an aircraft cabin, the device comprising:
- an antenna assembly configured to transmit and receive communication data in a first frequency band from a communication network and to receive localization data in a second frequency band from a localization network, said antenna assembly comprising an antenna having a radiation diagram of revolution around a main axis, the radiation being maximum in the direction of this main axis, and a radiation confinement system configured to limit radiation outside said axis of the antenna;
- a modem connected to the antenna, configured to allow transmission and reception of communication data through a communication network;
- a localization data receiver.

The invention is advantageously supplemented by the following features, taken alone or in any one of their technically possible combinations:
- it comprises a cylindrical housing comprising a cavity configured to accommodate the antenna assembly, the modem and the localization data receiver; a cover configured to be attached to said cylindrical housing in a manner allowing orientation, said cover supporting the antenna assembly so as to orient said antenna assembly;
- the cover is attached to the housing by means of a hinge allowing orientation of said cover with respect to said housing;
- the radiation confinement system consists of a radio-frequency absorbing assembly positioned below the antenna and/or a metal cavity positioned around with the possibility of extending above the antenna and/or with at least one or more choke rings;
- it comprises an attachment system configured to attach said housing to a vertical wall of the aircraft such as a smooth surface such as a windshield of an aircraft, a lateral window of an aircraft;
- it comprises a loss-of-contact detector configured to interrupt a radio-electric transmission of the antenna assembly as soon as a loss of contact between said device and the wall of the aircraft is detected;
- it comprises a communication system configured to form an access point to a wireless network such as a Wi-Fi network, the communication network being accessible remotely through the access point;
- the antenna comprises a ground plane, a dielectric substrate positioned on said ground plane, a radiating element positioned on said dielectric substrate, a plurality of notches made in said ground plane to control and obtain a sufficient operating band so that said antenna radiates in said first and second frequency band.

The invention also relates to an aircraft comprising a cockpit comprising a windshield and a communication device according to the invention. The advantages of the invention are numerous.

It offers a removable, portable solution with universal connectivity. In addition thanks to its miniaturization, it allows a small size and small mass for low space requirements of the equipment and wireless operation in the cabin of an aircraft. It thus makes it possible to cover a sufficiently large frequency band for sending and receiving communication data in a first frequency band of a communication network and to receive localization data in a second frequency band of a localization network.

PRESENTATION OF THE FIGURES

Other features, aims and advantages of the invention will be revealed in the description that follows, which is purely illustrative and not limiting, and which must be read with reference to the appended drawings wherein.

DETAILED DESCRIPTION OF THE INVENTION

In all the figures, similar elements bear identical reference symbols.

Figure 1:
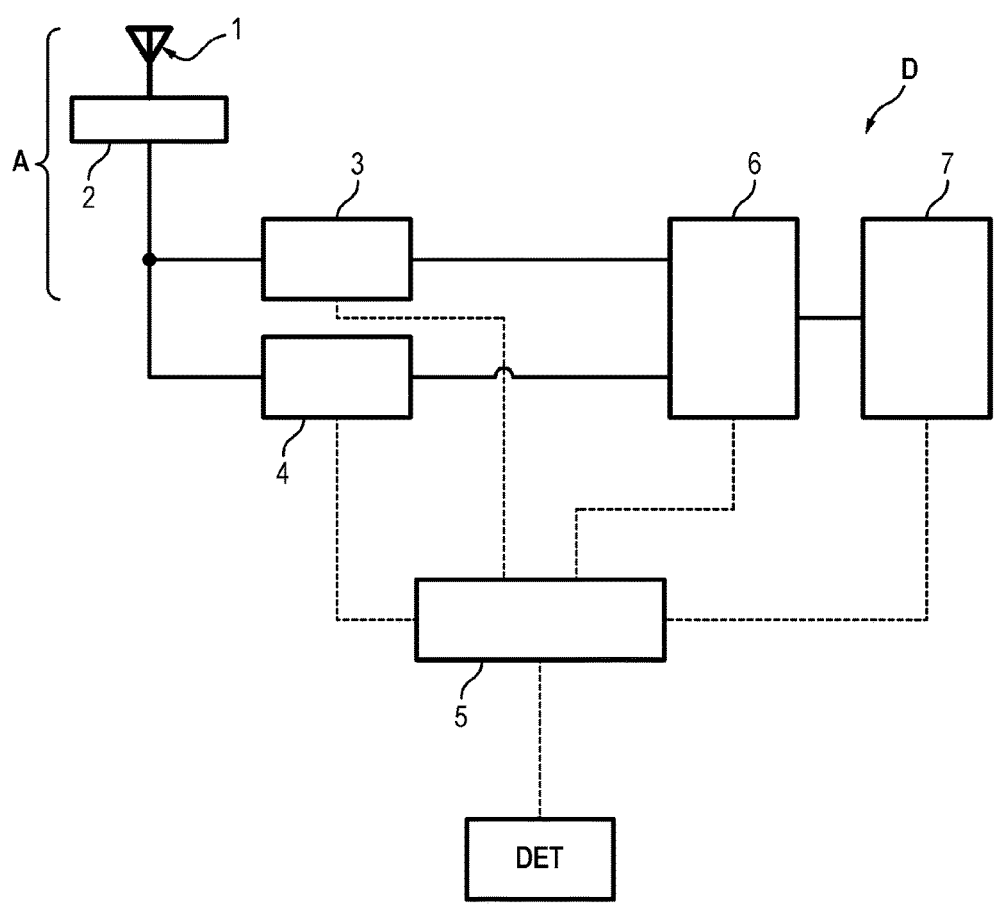
FIG. 1 illustrates a synoptic schematic of a communication device according to the invention.

In relation to FIG. 1, a communication device D intended to be positioned in a cabin of an aircraft comprises an antenna assembly A configured to transmit and receive communication data in a first frequency band from a communication network and to receive localization data in a second frequency band from a localization network.

The antenna 1 has a radiation diagram of revolution around a main axis, the radiation being maximum in the direction of this main axis.

Considering the fact that the communication device is intended to be positioned in the cabin of an aircraft, the antenna assembly A comprises a system 2 to limit radiation outside the main axis of the antenna 1.

Figure 2:
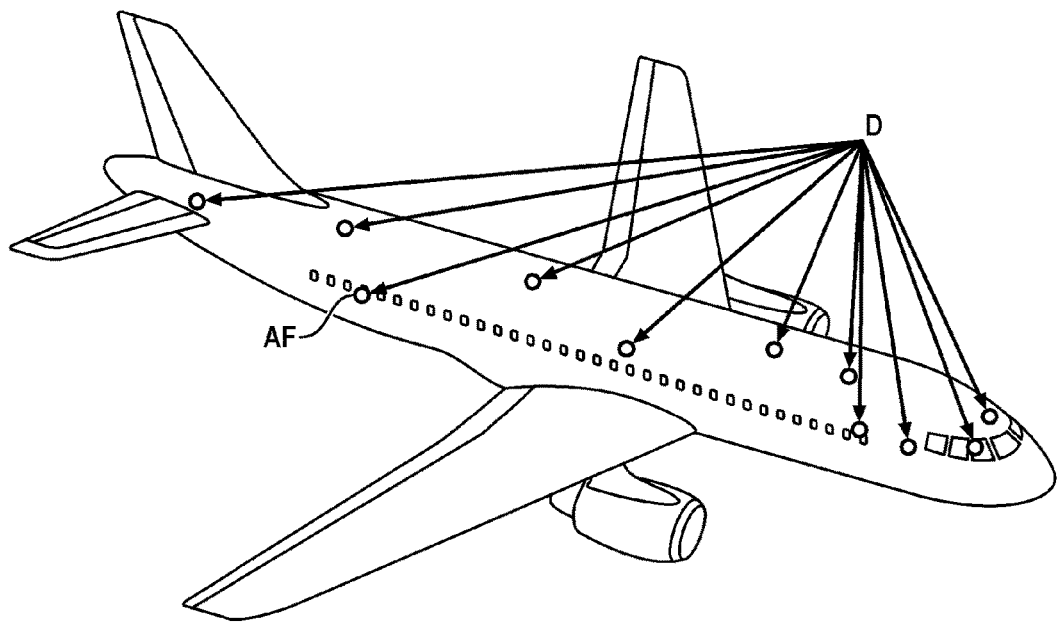
FIG. 2 illustrates schematically an aircraft inside which are positioned, according to several possibilities, a communication device according to the invention.

The communication device D can be positioned at several places in the cabin of the aircraft. As illustrated in FIG. 2, the device can be positioned in the cockpit of the aircraft AF, or at several different places in the space reserved for passengers.

Again in relation to FIG. 1, the communication device also comprises a modem 3 connected to the antenna 1 which is configured to allow the transmission and reception of communication data through the communication network and a receiver 4 of localization data of the GPS type.

The antenna 1 is dual band and can send and receive communication data on the IRIDIUM communication network. The IRIDIUM network is a network of orbital communication satellites. This network is capable of ensuring a connection 24 hours out of 24 and provides coverage everywhere in the world, comprising the polar circle regions.

Of course, the communication device can operate with any other orbital or geostationary satellite communication network provided that the modem 3 that is used is that of the desired communication network. It should however be noted that some of these different networks do not provide global coverage and permanent operation.

The receiver 4 of localization data makes it possible at any time to localize the communication device by geo-positioning and thus the aircraft or the vehicle wherein it is carried. In addition to geographic coordinates, the GPS will deliver the following information: GMT time, altitude, ground speed, heading, etc. Advantageously, the localization data receiver delivers this information automatically, at a definite rate corresponding to the means wherein it is carried and/or to each message or datum transmitted by the communication device.

To provide for managing, on the one hand, the transmission/reception on the communication network, and on the other hand the reception of localization data coming from the localization network, the communication device comprises a control unit 6. This unit allows management of all the communication links and assignment of connection priorities (crew and/or passengers). It also manages the internal and external operation of the assembly and has functionalities for managing and actively controlling the transmitting and receiving levels of the different networks used (Iridium and localization). Moreover, it has on-board software allowing compression and decompression of data as well as data encryption and decryption functions.

The communication device can form an access point for a wireless network such as a Wi-Fi network, the communication network being accessible remotely via the access point.

Thus, via the access point thus formed, mobile communication equipment can gain access to the data communication network, the access point thus routing communications or transferring data from mobile equipment on board the aircraft (when the communication device is positioned in the cockpit of the aircraft) to the final recipient or the final network desired through the data communication network.

To this end, the communication device comprises a wireless communication unit 7. In particular, the access point is a Wi-Fi access point. As such, the device of the wireless communication unit 7 comprises a WiFi card (not shown) to create the access point, as well as a Wi-Fi antenna (not shown).

The communication device comprises a battery 5 which advantageously has a long life, meaning that it will allow a communication device to operate for a minimum of five hours without interruption. The battery 5 is advantageously rechargeable and is connected to the components of the communication device which need an electric power supply.

Figure 3:
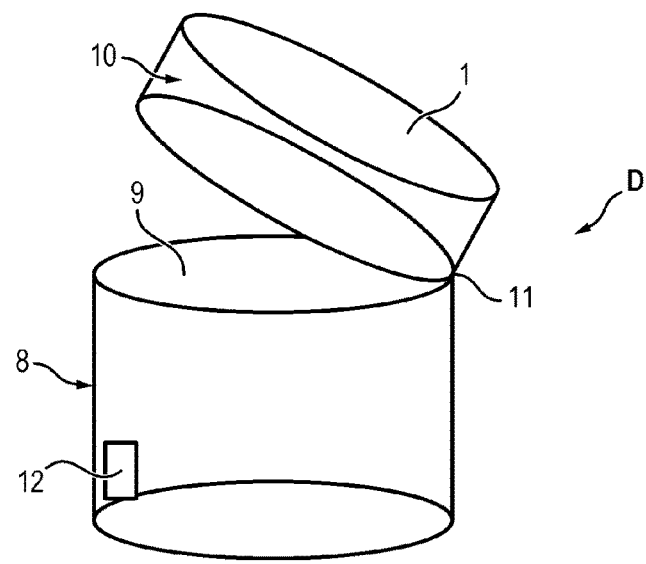
FIG. 3 illustrates a communication device according to the invention.

In relation to FIG. 3, the communication device also comprises a cylindrical housing 8 comprising a cavity 9 configured to accommodate components of said device and a cover 10 configured to be attached to said cylindrical housing in a manner allowing orientation. The cover 10 supports the antenna 1 and the confinement system 2, the antenna assembly (antenna with confinement system) being then capable of orientation with respect to the housing 8. This allow the device to be positioned at an ad hoc location, the antenna 1 with its confinement system 2 then being oriented separately.

In order to orient the cover 10 with respect to the housing 8, the communication device comprises one or more hinge(s) 11. It is of course possible to contemplate other types of components which would make it possible to orient the cover 10 with respect to the housing 8.

Advantageously, the radiation confinement system 2 can take on several forms (see below).

In order to connect the housing to a smooth surface such as the windshield of an aircraft, a lateral window of an aircraft, the communication device comprises an attachment system 12.

The attachment system 12 can take on several forms.

It can be a suction cup provided with a vacuum pump which can attach to any smooth surface and windshield, lateral window or port in the cockpit or in the cabin. This suction cup can deploy at the base of the housing or on the side of the housing (see FIG. 3).

It can be an attachment system using the Velcro™ system of which the male part is attached to the housing 8 and the female part is attached to the inner trim of the aircraft or to the accessories or any other part capable of receiving this female part.

The communication device D must be able to be cut off as soon as the communication device is no longer in contact with its attachment support in the aircraft (a glazed wall of the aircraft for example). In fact, in this case, the communication device can perturb the operation of the aircraft.

To accomplish this, the communication device comprises a DET loss of contact detector configured to detect the detachment of the device from its support in the aircraft.

This DET detector has the purpose of cutting the radio-electric transmission of the antenna 1 if contact with the glazed wall of the aircraft is lost. This additional safety thus avoids any risk of radio-electric transmission toward the occupants or the instruments of the aircraft.

Preferably, one or more switches of the pushbutton type are installed inside the cavity 9 of the communication device so that only the button portion protruded from the height of the cavity 9, toward the window. With a switch of the normally open type, the electrical connection is created when the button is pressed. The attachment of the invention to the glazed wall presses the button(s). In this nominal position, the electrical connection is established and the antenna 1 can operate.

It the event of a detachment of the device with respect to the wall, the pressure on at least one of the switches is no longer maintained. The electrical connection is then cut off.

As a variant, the contact loss detector can use other types of sensors such as a pressure switch or an inductive detector or a capacitive detector or an optical detector. For example, if the cavity is connected in proximity to a metallic part at the edge of the window, the inductive detector detects the loss of contact with the metal wall of the aircraft.

Figure 4A:
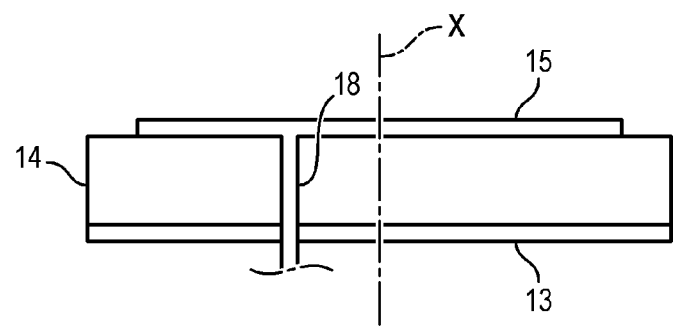
FIGS. 4a and 4b illustrate respectively a section view and a perspective view of the bottom of an antenna of a communication device according to the invention.
Figure 4B:
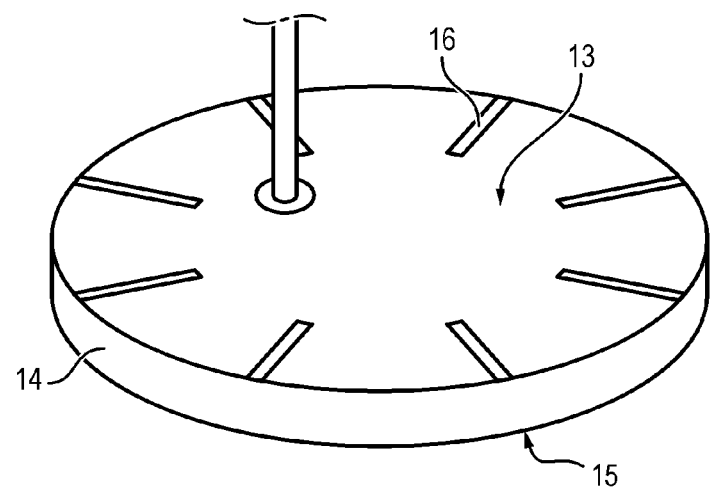

The antenna 1 is preferably of the type described in patent FR 2 912 266 B1 of which one section view and one perspective view are illustrated in FIGS. 4a and 4b respectively. This antenna also comprises a ground plane 13, a dielectric substrate 14 positioned on the ground plane 13, a radiating element 15 positioned on the dielectric substrate 14, a plurality of notches 16 made in the ground plane 13 so as to control and obtain a sufficient operating band so that said antenna radiates in said first and second frequency bands. In FIG. 4b, eight thin notches 16 are provided in the ground plane 13. This antenna radiates along a main axis X.

To feed the antenna 1, the latter comprises a coaxial probe 18 which is connected to the radiating element 15.

The antenna 1 is of a generally circular shape.

Such an antenna allows simultaneous transmission or reception of communication data and reception of localization data.

In addition, the antenna is omni-directional and is of small size. The diameter of the dielectric substrate 14 is on the order of $\lambda/3$ and its thickness is on the order of $\lambda/30$ with $\lambda$ corresponding to the average wavelength of the operating frequencies of the communication device.

Advantageously, to increase the capacities and the performance of the antenna, the antenna 1 comprises specific filters (not shown) and preamplifiers (not shown).

The radiation confinement system 2 of the antenna can take several forms.

Figure 5A:
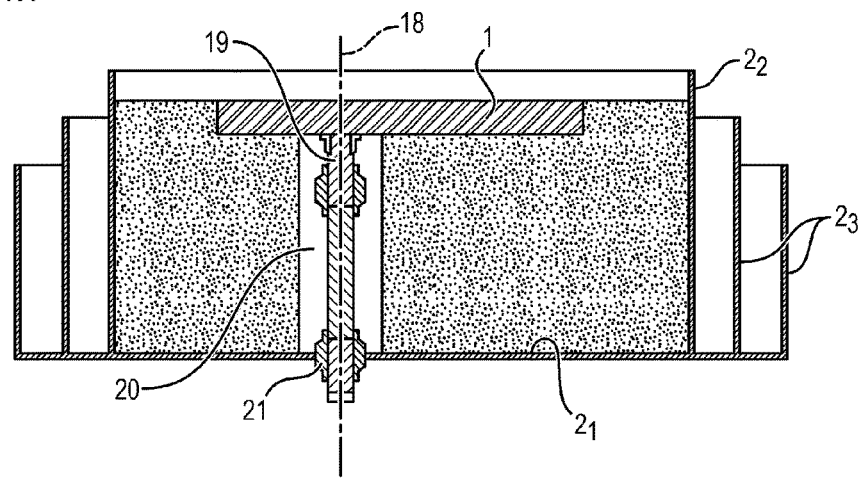
FIGS. 5a and 5b illustrate respectively a section view and a top view of an antenna assembly according to the invention comprising an antenna and a radiation confinement system according to several embodiments.
Figure 5B:
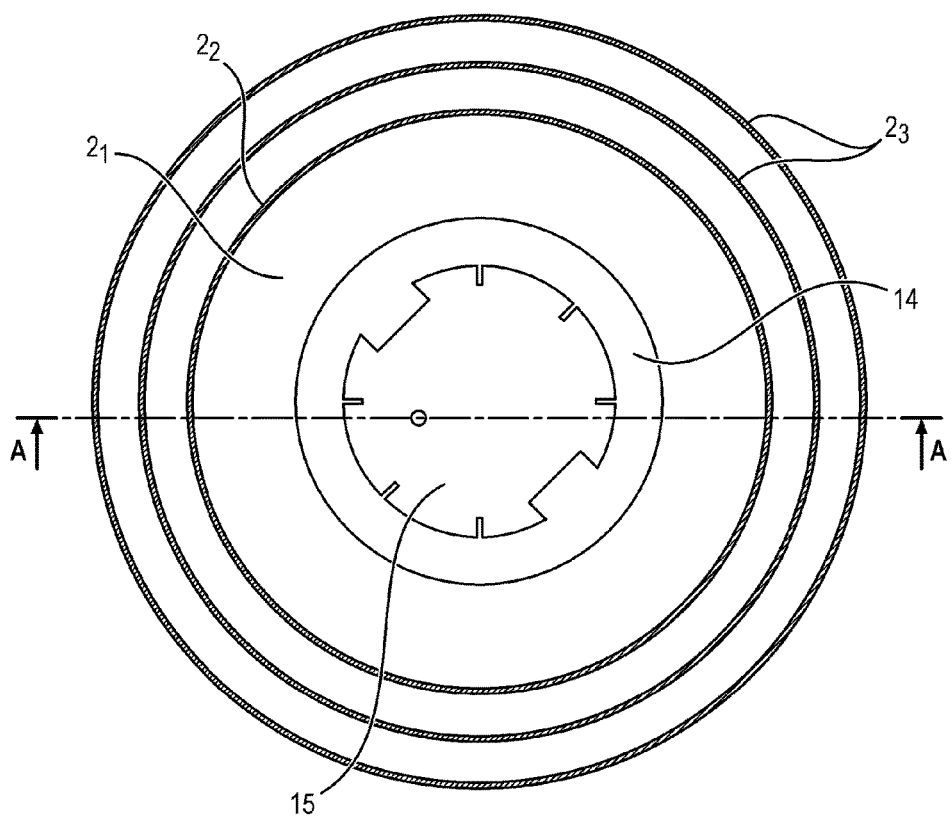

We have illustrated in FIGS. 5a and 5b, the antenna assembly A with three possible embodiments for the confinement system, referred to as $2_1$, $2_2$, $2_3$ in these figures. Each of the embodiments of the confinement system 2 can be used along or in combination with the others.

According to a first embodiment, the confinement system 2 is a radio-frequency absorbing assembly $2_1$ positioned under the antenna 1. The absorbing assembly is for example made of foam type material loaded with carbon particles and with thickness on the order of 2 to 5 cm.

In the case where the confinement system 2 is an absorbing assembly, the communication device D comprises a radio-frequency connector 19 connected to the coaxial probe 18 of the antenna 1, a radio-frequency cable 20 connected between the connector 19 and a radio-frequency crossover 21.

According to a second embodiment, the confinement system 2 is a metal cavity $2_2$ positioned around with the possibility of extending above it.

According to a third embodiment, the confinement system consists of one or more choke rings $2_3$ positioned around the antenna 1.

The invention claimed is:

1. A communication device intended to be positioned inside a cabin of an aircraft, the device comprising:
   a single antenna assembly configured to transmit and receive communication data in a first frequency band from a communication network and to receive localization data in a second frequency band from a localization network, said antenna assembly comprising a single antenna having a single radiation diagram of revolution around a main axis, the radiation diagram being maximum in the direction of this main axis, said antenna comprising a radiation confinement system configured to limit radiation outside said axis of the antenna;
   a modem connected to the antenna, configured to allow transmission and reception of communication data through said communication network;
   a localization data receiver;
   a cylindrical housing comprising a cavity configured to accommodate the antenna assembly, the modem and the localization data receiver; and
   a cover configured to be attached to said cylindrical housing in a manner allowing orientation, said cover supporting the antenna assembly so as to orient said antenna assembly.

2. The communication device according to claim 1, wherein the cover is attached to the housing by means of at least one hinge allowing orientation of said cover with respect to said housing.

3. The communication device according to claim 2, wherein the radiation confinement system consists of a radio-frequency absorbing assembly positioned below the antenna and/or a metal cavity positioned around with the possibility of extending above the antenna and/or with at least one or more choke rings.

4. The communication device according to claim 1, wherein the radiation confinement system consists of a radiofrequency absorbing assembly positioned below the antenna and/or a metal cavity positioned around with the possibility of extending above the antenna and/or with at least one or more choke rings.

5. The communication device according to claim 1, comprising an attachment system configured to attach said housing on a wall of the aircraft such as a smooth surface such as a windshield of an aircraft, a lateral window of an aircraft.

6. The communication device according to claim 5, comprising a loss of contact detector configured to interrupt a radioelectric transmission of the antenna assembly as soon as a loss of contact between said device and the wall of the aircraft is detected.

7. The communication device according to claim 1, comprising a communication system configured to form an access point to a wireless network such as a Wi-Fi network, the communication network being accessible remotely through the access point.

8. The communication device according to claim 1, wherein the antenna comprises a ground plane, a dielectric substrate positioned on said ground plane, a radiating element positioned on said dielectric substrate, a plurality of notches made in said ground plane so as to control and obtain a sufficient operating band so that said antenna radiates in said first and second frequency bands.

9. An aircraft comprising a cabin, the cabin comprising a windshield and the communication device according to claim 1.

* * * * *